Dec. 3, 1963   E. S. IDA   3,113,299
ELECTRICAL PRIORITY INDICATOR EMPLOYING GAS DISCHARGE TUBES
Filed Jan. 5, 1962
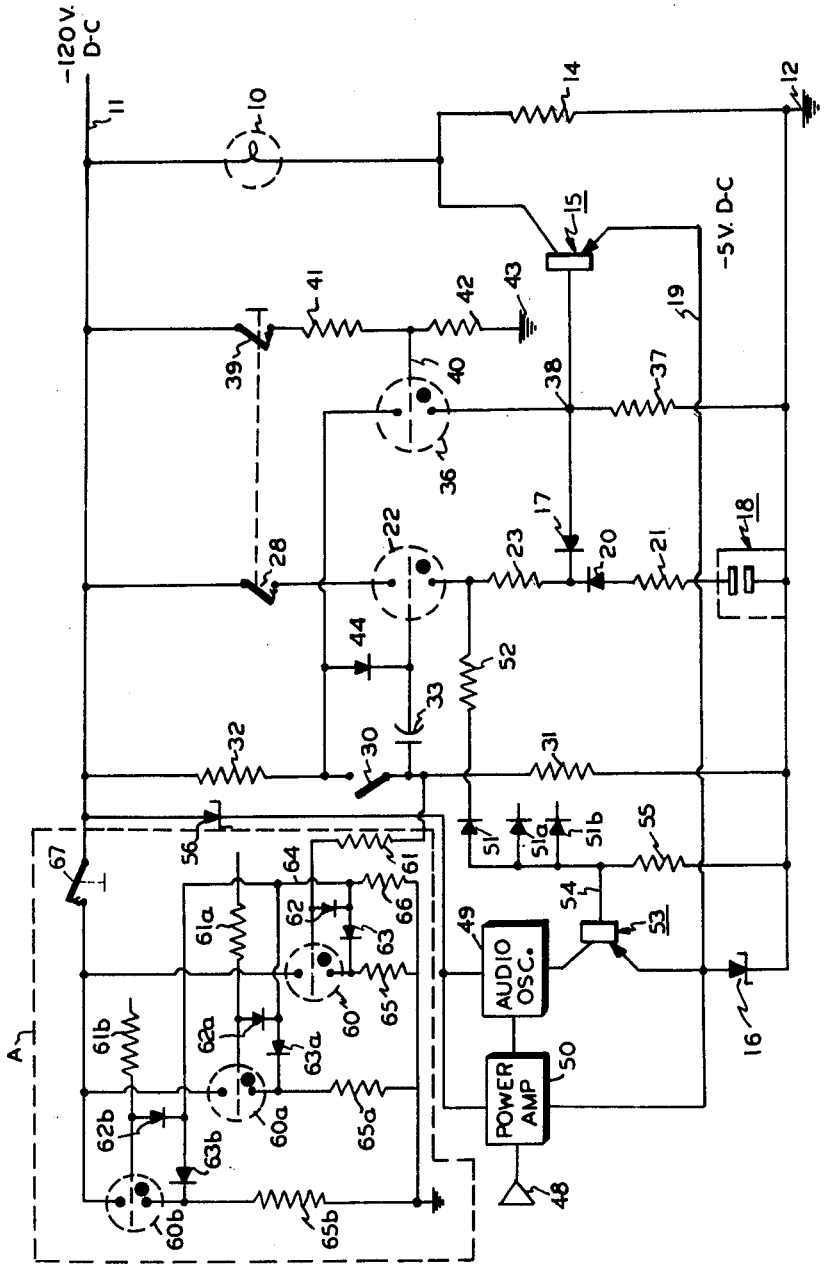
INVENTOR.
EDWARD S IDA
BY Harry J. McCauley
ATTORNEY

United States Patent Office 3,113,299  
Patented Dec. 3, 1963

3,113,299  
ELECTRICAL PRIORITY INDICATOR EMPLOYING GAS DISCHARGE TUBES  
Edward S. Ida, Folsom, Pa., assignor to E. I. du Pont de Nemours and Company, Wilmington, Del., a corporation of Delaware  
Filed Jan. 5, 1962, Ser. No. 164,438  
2 Claims. (Cl. 340—213)

This invention relates to an electrical priority order of occurrence indication apparatus, and particularly to such an apparatus utilizing gaseous triodes as the indicating devices.

It is often necessary to obtain an indication of the first of a multiplicity of events which occurs, a typical example being the situation where a number of points within a process are being monitored and the first of these points to depart from normality, by its very order of departure, supplies information of a trend of process deviation which it is essential to have notice of at as early a time as practicable.

An object of this invention is to provide an improved electrical priority indication apparatus, one that is relatively simple in circuit arrangement, economical in first cost and maintenance, reliable and compact in size, and one which is particularly adapted to use with annunciator circuits employed for the monitoring of relatively complex processes or operations.

The manner in which these objects are obtained will become apparent from the detailed description and the drawing, which is a schematic circuit diagram of a preferred embodiment of indicator according to this invention shown in association with an annunciator circuit, which latter is the subject of a separate U.S. patent application, namely, S.N. 164,496, filed of even date herewith.

Generally, the electrical priority order of occurrence indication apparatus of this invention comprises, in combination, a plurality of gaseous triodes each provided on the anode side with a series-connected individual voltage-dropping resistor, said triodes with associated voltage-dropping resistors being connected in parallel one with another across a D.-C. power source provided with a main power switch, individual ones of the triodes being reserved to the indication of individual events the priority order of occurrence of which is to be registered, individual event-signaling electrical leads connected to the grid elements of said individual ones of said triodes, an individual pair of diodes connected to the negative side of said voltage-dropping resistor in series shunting the grid and anode elements of individual ones of the triodes with diode cathodes oriented toward said anode elements and diode anodes oriented toward said grid elements, and a common resistor connected from the positive side of the D.-C. power source to the common junction of each said pair of diodes.

Referring to the drawing, the priority of occurrence indication apparatus, hereinafter called the "first-on" indicator for purposes of brevity, comprises the equipment within the broken line enclosure A, which, in this instance, has a capacity of indication for only three events although, of course, the apparatus can be expanded indefinitely to accommodate virtually any number of events which it is desired be indicated.

Employing the identical reference numeral designation employed in the copending U.S. application S.N. 164,496, hereinbefore referred to, in order to facilitate cross comparison of the subject matters of the two patent applications, the D.-C. power is drawn across bus 11 (typically, —120 v., D.-C.) to ground, the manually operated, normally closed main power switch 67 being interposed in bus conductor 11.

The event indicating agencies consist of a plurality of gaseous triodes (typically LTG 27–2 neon types), such as 60, 60a, 60b, etc., each of which is reserved to an individual event the first order of occurrence of which is to be registered. These gaseous triodes are connected in parallel one with another across the D.-C. power source, and the circuit of each is provided with a voltage-dropping resistor, such as 65, 65a, 65b, etc., respectively, each typically, 39K, ¼ watt size.

Voltage signals are relied on as the event-signaling indicia and these are applied to the grids of the gaseous triodes through leads provided with resistors 61, 61a, 61b, etc. (each, typically, 120K, ¼ watt size), respectively, the only connection detailed in full being that via the lead containing resistor 61, which is shown as servicing an annunciator circuit monitoring the performance of a single point, such as, for example, the pressure or temperature existing within a chemical reactor. Each gaseous triode is provided with a pair of series-connected diodes 62—63, 62a—63a, 62b—63b, etc. (typically, 1N1692 type), shunting the respective triode grid and anode, the diode cathodes being oriented toward the triode anodes and, finally, all of the diodes direct-connected to the triode anode elements are grounded by a common connection 64 inclusive of a voltage-dropping resistor 66 (typically, 120K, ¼ watt size).

Description of the operation of the first-on indicator will be deferred until the general arrangement of the annunciator circuit is described.

The annunciator incorporates an incandescent lamp 10 connected, in this instance, across the same power supply as the first-on indicator, but above switch 67. This lamp is intended to be illuminated at a low brilliance when the point under surveillance is operating normally, as sensed by alarm switch contacts 30, provided with voltage-dropping resistors 31 and 32, which contacts are intended to remain closed normally but are made to open, by conventional means not detailed, upon variance of the point from normal operation range. The annunciator is provided with a gaseous triode 22 (typically, an LTG–27–2 neon type) connected via acknowledgment contact pair 28 across the power supply in series with a conventional flasher unit 18, such as that shown in the G.E. Transistor Manual, 2nd edition, delivering a modulated current flow of 0–1.5 ma. to transistor 15 at a frequency of about 1 cycle per second. Diode 20 isolates the flasher, so that one unit can be made to serve a plurality of annunciators, and resistors 21 and 23 are current-limiting resistors.

Transistor 15 can be a P-N-P RCA type 2N586 connected in parallel with the series-dimming resistor 14 in circuit with lamp 10, with its collector and emitter elements in series with the filament of lamp 10 through a zener diode 16 via lead 19 biasing the emitter at about —5 v. The base element of transistor 15 is connected via the positive side of a diode 17 to a point between diode 20 and resistor 23. The coupling means to the grid of triode 22 consists of capacitor 33 connected to the positive side of alarm switch contacts 30 together with a diode 44 shunting these contacts. Preferably, a second gaseous triode 36, which can be of the same type as triode 22, is connected in shunt around alarm switch contacts 30 to the positive side of the power supply through voltage-dropping resistor 37. A tap connection 38 ties the base element of transistor 15 to ground through the same resistor 37. The grid of triode 36 is connected by lead 40 to the bus 11 through resistor 41 and a second pair of acknowledgment contacts 39 ganged for common operation with contacts 28, resistor 42 grounded at 43 completing the circuit.

Although not essential to operation, an audible signal auxiliary comprising a horn 48 powered by audio oscillator 49 and power amplifier 50 is often desirable, using power drawn from bus 11 through zener diode 56, with return to ground through zener diode 16. The signal to this latter auxiliary is drawn via resistor 52 and diode 51 and impressed on the base of transistor 53 (typically, an RCA type 2N586) through lead 54, which circuit is completed to ground through resistor 55. Transistor 53 is connected with collector and emitter elements in series with audio oscillator 49, and emitter connection completed to zener diode 16. Diodes 51a and 51b constitute input connections for yet other annunciators, where the audible signal auxiliary is used to serve a multiplicity of points.

The operation of the annunciator circuit is, briefly, as follows. With alarm contacts 30 closed, as is normally the case, and with triodes 22 and 36 extinguished, transistor 15 will be non-conducting, due to its —5 v. reverse bias, and lamp 10 will be illuminated dimly due to the voltage drop across its series resistor 14. Upon failure occurring within the apparatus monitored by the annunciator circuit, alarm contacts 30 open responsive to the conventional means sensing the process condition under surveillance, whereupon capacitor 33 coupled to the grid of triode 22 causes the latter to fire. The repetitive opening and closing of the flasher circuit 18 contacts responsive to flow of current through triode 22 causes a modulation of current flow to transistor 15 between 0 and 1.5 ma. at a typical frequency of 1 cycle per second, the voltage drop across triode 22 remaining constant at approximately 80 volts. The current flowing to the base of transistor 15 is amplified at a current gain of typically 75 to cause lamp 10 to flash from dim to bright repetitively, thereby signaling an alarm condition.

Should alarm contacts 30 reclose, triode 22 remains lit, continuing the visible signal of lamp 10. In this connection, diode 44 is provided as a safeguard against the accidental extinguishment of triode 22.

Depressing the acknowledgment button, and thereby opening contacts 39, ignites the second triode 36, thereby passing a steady current to transistor 15 to drive it to full conduction with maintenance of lamp 10 in steady bright illumination at a power consumption of about 50 ma. Diode 17 prevents the diversion of current from triode 36 through flasher 18 to ground. Supplying excess driving current to transistor 15 assures its operation as a switch, with minimization of its power dissipation and consequent heating.

Coincidentally, the power supply to triode 22 having been interrupted by the opening of contacts 28, triode 22 is, during this time, extinguished, capacitor 33 permitting this to occur even when alarm contacts 30 remain open.

Lamp 10 remains illuminated at "steady bright" until alarm contacts 30 reclose, reducing the voltage to triode 36 below the level maintaining glow discharge. Thereupon, triode 36 is extinguished and lamp 10 immediately reverts to its "dim," or normal condition, completing the cycle. The same sequence of events which operates triode 22 is effective to concurrently send the necessary actuation signal to transistor 53, which thereupon provides amplification actuating oscillator 49 and sounding horn 48 through the intermediate amplification of 50.

Also, as soon as alarm switch contacts 30 open, a voltage signal is applied via the signal lead incorporating resistor 61 to the grid of gaseous triode 60. This causes triode 60 to fire, so that a voltage is developed across voltage-dropping resistor 65, whereupon diode 63 conducts, which in turn causes all of the remaining diodes 62, 62a, 62b, etc., to clamp their associated grids to a potential approximately midway between 0 and —120 volts. Under these circumstances, sufficient voltage is prevented from being developed by subsequent input signals originating at other points to fire any of the other triodes of the first-on indicator. Consequently, triode 60 is illuminated and constitutes a visual indication of the first point to alarm, which indication is preserved until the main power switch 67 is opened to clear the circuit, and then reclosed to restore it to the ready condition again.

As an aid to quick interpretation, all triodes 60, 60a, 60b, etc., are preferably mounted in a labelled array in a common bank, thus providing a very distinctive signal board.

From the foregoing, it will be understood that this invention can be modified in numerous respects without departure from its essential spirit, and it is therefore intended to be limited only within the scope of the following claims.

I claim:
1. An electrical priority order of occurrence indication apparatus comprising in combination a plurality of gaseous triodes each provided on the anode side with a series-connected individual voltage-dropping resistor, said triodes with associated voltage-dropping resistors being connected in parallel one with another across a D.-C. power source provided with a main power switch, individual ones of said triodes being reserved to the indication of individual events the priority order of occurrence of which is to be registered, individual event-signaling electrical leads connected to the grid elements of said individual ones of said triodes, an individual pair of diodes connected to the negative side of said voltage-dropping resistor in series shunting the grid and anode elements of said individual ones of said triodes with diode cathodes oriented toward said anode elements and diode anodes oriented toward said grid elements, and a common resistor connected from the positive side of said D.-C. power source to the common junction of each said pair of diodes.

2. An electrical priority order of occurrence indication apparatus according to claim 1 wherein voltage-dropping resistors are connected in series with said event-signaling electrical leads ahead of said grid elements.

References Cited in the file of this patent

UNITED STATES PATENTS

| 2,426,054 | Rose | Aug. 19, 1947 |
| 2,719,966 | Schurr | Oct. 4, 1955 |
| 2,898,515 | Rywak | Aug. 4, 1959 |